(12) United States Patent
Yang

(10) Patent No.: US 7,795,823 B2
(45) Date of Patent: Sep. 14, 2010

(54) ACTUATION DEVICE HAVING SHAPE MEMORY ALLOY COMPONENT

(75) Inventor: Kevin Yang, Taipei Hsien (TW)

(73) Assignee: Chicony Electronics Co., Ltd., Taipei Hsien (TW)

( * ) Notice: Subject to any disclaimer, the term of this patent is extended or adjusted under 35 U.S.C. 154(b) by 392 days.

(21) Appl. No.: 12/078,591

(22) Filed: Apr. 2, 2008

(65) Prior Publication Data

US 2009/0128064 A1   May 21, 2009

(30) Foreign Application Priority Data

Nov. 20, 2007   (TW) .............................. 96143876 A

(51) Int. Cl.
*G03B 3/10* (2006.01)
*H02N 10/00* (2006.01)
(52) U.S. Cl. ...................... 318/117; 359/823; 60/528; 396/133

(58) Field of Classification Search ................ 318/116, 318/117; 359/819, 822, 823; 60/516, 527, 60/528; 396/133
See application file for complete search history.

(56) References Cited

U.S. PATENT DOCUMENTS

| 4,899,543 | A  | * | 2/1990 | Romanelli et al. ............ 60/527 |
| 4,945,727 | A  | * | 8/1990 | Whitehead et al. ............ 60/527 |
| 6,427,712 | B1 | * | 8/2002 | Ashurst ....................... 137/62 |
| 7,548,010 | B2 | * | 6/2009 | Browne et al. .............. 310/307 |
| 2005/0005705 | A1 | * | 1/2005 | Vestel et al. .................. 73/789 |
| 2010/0060776 | A1 | * | 3/2010 | Topliss et al. ............... 348/340 |
| 2010/0074608 | A1 | * | 3/2010 | Topliss ....................... 396/133 |

* cited by examiner

*Primary Examiner*—Bentsu Ro
(74) *Attorney, Agent, or Firm*—Bacon & Thomas, PLLC

(57) ABSTRACT

The present invention provides an actuation device having a shape memory alloy component. The present invention utilizes a length contraction occurred to the shape memory alloy component during its phase transformation from martensite to austenite. The length contraction causes a slider, a carrier and a base to move relatively. Also, the present invention utilizes thermal conductivity of the base to speed up heat dissipation of the shape memory alloy component, so that response time for actuating the carrier can be reduced.

10 Claims, 4 Drawing Sheets

ACTUATION DEVICE HAVING SHAPE MEMORY ALLOY COMPONENT

BACKGROUND OF THE INVENTION

1. Field of the Invention

The present invention relates to an actuation device, and more particularly, to an actuation device that is provided with a shape memory alloy component and that utilizes a length contraction resulting from phase transformation of shape memory alloys.

2. Description of the Related Art

As consumer technology industry keeps its vigorous growth in modern days, all kinds of electronic products making things better and easier for consumers never stop emerging out of the market. On the list of some most widely-used electronic products in recent years, digital cameras and camera cell phones may never be missed.

A prior-art lens module for a digital camera or camera cell phone typically includes a housing, an optical lens and an image sensor. The optical lens for capturing images is coupled to the front side of the housing, wherein the optical lens is generally adjusted through certain mechanism, either of manual or automatic control, so that desired focal lengths can be obtained accordingly.

Said prior-art lens module for digital cameras or camera cell phones are required to be lightweight, thin and small, while at the same time, it needs to be exquisite and durable. Therefore, in a digital camera or camera cell phone, uses of lens modules for focal-length adjustment, which is controlled manually or driven by an electric motor (i.e., linear or non-linear movements), may be restricted due to space or weight limitations. This could further limit zoom ratios or other functions of the optical lens.

Typically, a prior-art lens module is provided with a flat spring that works by balancing with electromagnetism. Nonetheless, flat springs are likely to be deformed by external forces. For example, forces resulting from shocks, resets or continual uses of optical lenses may influence the stability and precision in lens movements. Therefore, there are drawbacks to prior-art lens modules that need to be improved.

SUMMARY OF THE INVENTION

An object of the present invention is to provide an actuation device having a shape memory alloy component. A length contraction occurs to the shape memory alloy component during its phase transformation from martensite to austenite. The present invention uses this length contraction to cause a slider, a carrier and a base to move relatively.

Another object of the present invention is to provide an actuation device having a shape memory alloy component that utilizes thermal conductivity of the base to speed up heat dissipation of the shape memory alloy component and to reduce the response time for actuating the carrier.

To achieve the above objects, an actuation device having a shape memory alloy component of the present invention comprises a base, a plurality of sliders which are disposed on the base, a carrier which is disposed on the plurality of sliders, a shape memory alloy component which is disposed along the outer surfaces of the sliders in a surrounding manner, a spring component which is disposed on the carrier and surrounds the outer surface of the carrier. By utilizing a length contraction of the shape memory alloy component during phase transformation from martensite to austenite, the sliders are pressed by the shape memory alloy component. The sliders then move in an inward direction, actuating the carrier in an upward direction; the actuation of the carrier then compresses the spring component.

Preferably, kinetic energy can be stored in the spring component when during compression.

Preferably, each slider is provided with an opening. When the length of the shape memory alloy component is contracted, it contacts the base through each opening of the slider so that heat dissipation for the shape memory alloy component is hastened.

Preferably, when the shape memory alloy component reverts to its original length, the spring component releases the kinetic energy previously stored within and stretches in an inward direction to press the carrier in a downward direction. The carrier is thus actuated in a downward direction and drives the sliders to move in an outward direction.

Preferably, a plurality of holding components are further provided at the base, securing both ends of the shape memory alloy component.

Preferably, the actuation device having a shape memory alloy component can be applied to a lens module.

DETAILED DESCRIPTION OF THE PREFERRED EMBODIMENT

Although the present invention has been described in considerable detail with reference to certain preferred embodiments thereof, those skilled in the art can easily understand that all kinds of alterations and changes can be made within the spirit and scope of the appended claims. Therefore, the spirit and scope of the appended claims should not be limited to the description of the preferred embodiments contained herein.

Figure 1:
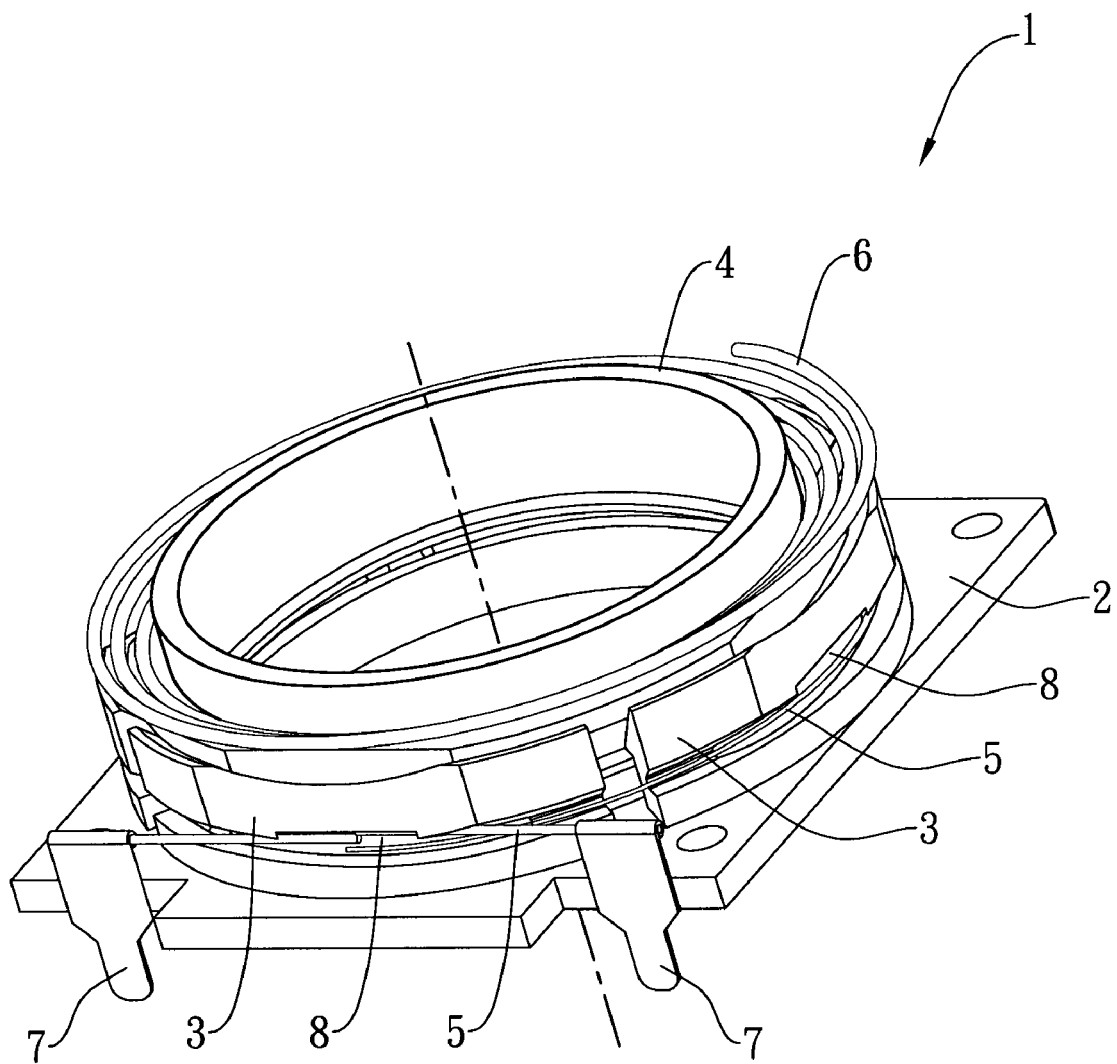
FIG. 1 shows a perspective view of an assembled actuation device having a shape memory alloy component according to the present invention.
Figure 2:
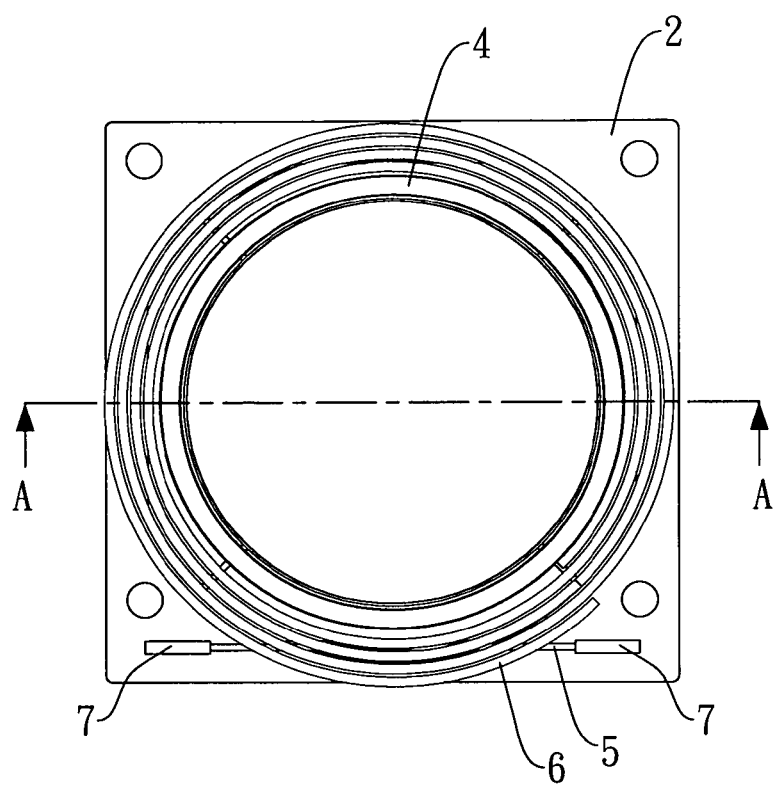
FIG. 2 shows a top view of the assembled actuation device having a shape memory alloy component according to the present invention.
Figure 3:
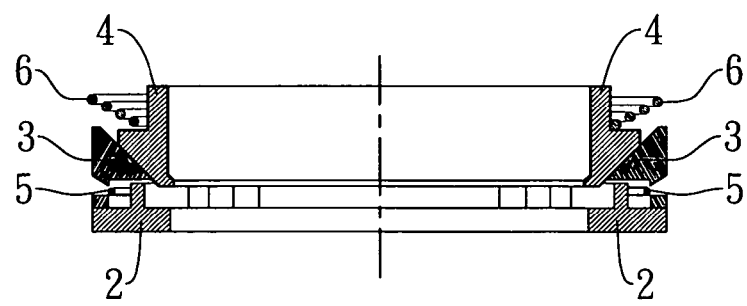
FIG. 3 shows a sectional view along line A-A in FIG. 2.

FIG. 1 shows a perspective view of an assembled actuation device 1 having a shape memory alloy component according to the present invention. FIG. 2 shows a top view of the assembled actuation device 1 having a shape memory alloy component according to the present invention. FIG. 3 shows a sectional view along line A-A in FIG. 2. Further description will be given with references to FIGS. 1, 2 and 3. In this embodiment, the actuation device 1 having a shape memory alloy component is applied to a lens module. According to the present invention, the actuation device 1 having a shape memory alloy component is provided that comprises a base 2, a plurality of sliders 3 which are disposed on the base 2, a carrier 4 which is disposed on the plurality of sliders 3, a shape memory alloy component 5 which is formed in the form of a thread and which is disposed along the outer surfaces of the sliders 3 in a surrounding manner, a spring component 6 which is disposed on the carrier 4 and which surrounds the outer surface of the carrier 4, and a plurality of holding components 7 which are disposed at one side of the base 2 and which secure both ends of the shape memory alloy component 5.

In this embodiment, an electric current is applied to the shape memory alloy component 5, and it is heated to a certain temperature using electric impedance of the material. Then, the crystal structure of the shape memory alloy component 5 changes from the martensite phase to the austenite phase, which results in a length contraction of the shape memory alloy component 5. After the length contraction, the shape memory alloy component 5 presses the sliders 3, making them move in an inward direction (toward the center of the circle). Since the sliders 3 are moved in an inward direction, the carrier 4 is pressed and actuated in an upward direction. And since the carrier 4 is actuated in an upward direction, the spring component 6 is compressed. It should be noted that during compression, the spring component 6 can store kinetic energy therein.

Figure 4:
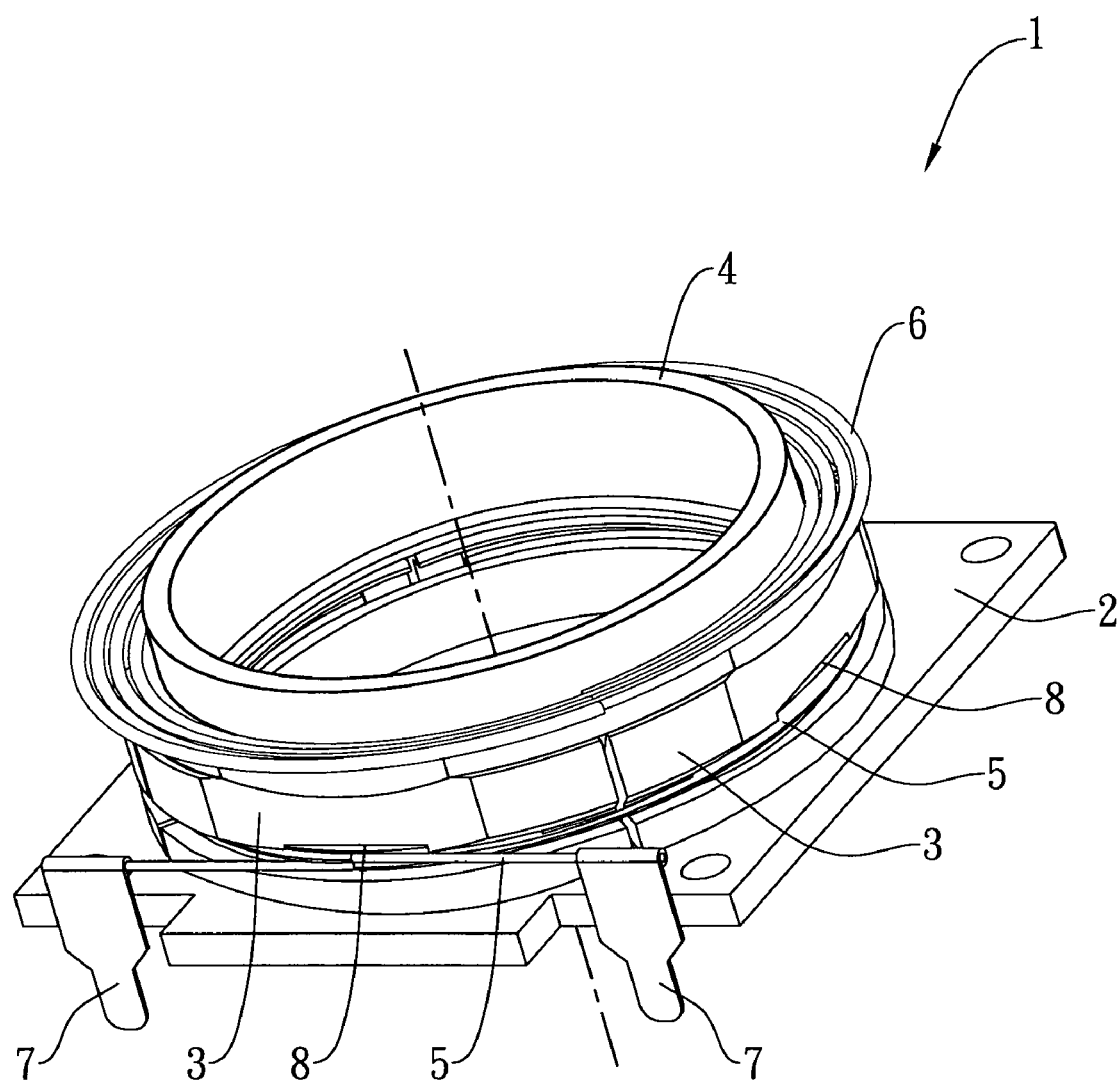
FIG. 4 shows a perspective view of the assembled actuation device having a shape memory alloy component according to the present invention.
Figure 5:
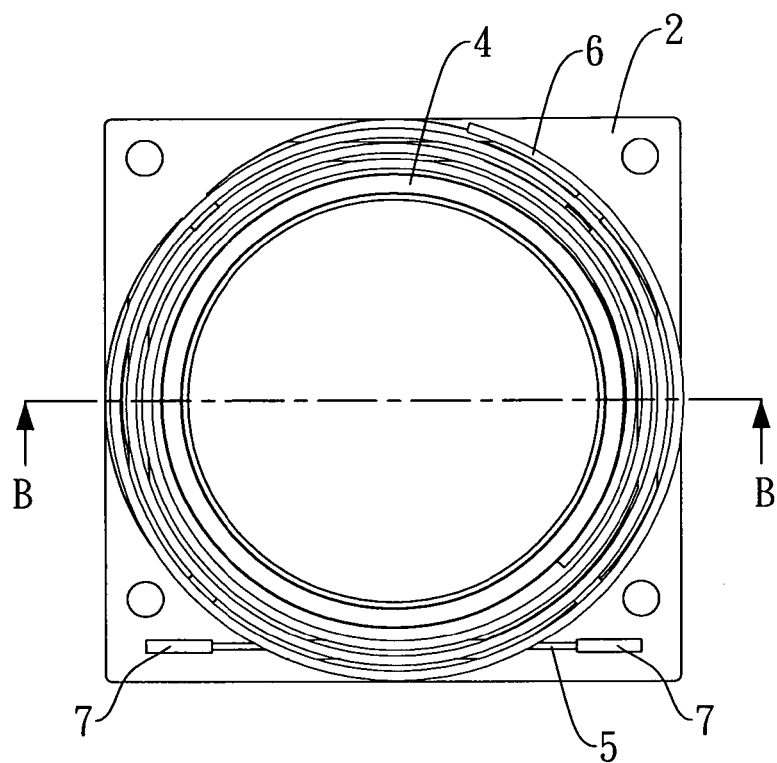
FIG. 5 shows a top view of the assembled actuation device having a shape memory alloy component according to the present invention.
Figure 6:
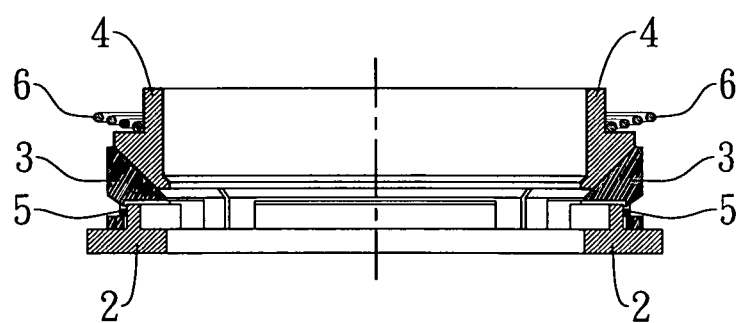
FIG. 6 shows a sectional view along line B-B in FIG. 5.

FIG. 4 shows a perspective view of an assembled actuation device 1 having a shape memory alloy component according to the present invention. FIG. 5 shows a top view of the assembled actuation device 1 having a shape memory alloy component according to the present invention. FIG. 6 shows a sectional view along line B-B in FIG. 5. With references to FIGS. 4, 5 and 6, each slider 3 is provided with an opening 8. After the length of the shape memory alloy component 5 is contracted, the shape memory alloy component 5 contacts the base 2 through each opening 8 of the slider 3; in consequence, heat dissipation for the shape memory alloy component 5 is hastened. As heat is transferred from the shape memory alloy component 5 to the base 2, the temperature of the shape memory alloy component 5 gradually lowers down beneath the phase transformation temperature. The shape memory alloy component 5 then reverts to its original length. After that, the spring component 6 releases the kinetic energy previously stored within and stretches in an inward direction (toward the center of the circle). The spring component 6 then presses the carrier 4 downwardly, actuating it in a downward direction. Since the carrier 4 is actuated in a downward direction, the sliders 3 are moved in an outward direction.

When an actuation device 1 having a shape memory alloy component according to the present invention is applied to a lens module, actuation of the carrier 4 in an upward or downward direction will enable the lens of the lens module (not shown) carried therein to zoom in or out. As a result, the focal length of the optical lens can be adjusted.

The advantages of the present invention are as follows:

(1) The present invention utilizes the length contraction of the shape memory alloy component 5 as it undergoes phase transformation from martensite to austenite. When the length of the shape memory alloy component is contracted, the sliders 3 are pressed to move in an inward direction (toward the center of the circle). Then, the carrier 4 is actuated in an upward direction and compresses the spring component 6.

(2) Kinetic energy can be stored in the spring component 6 during compression. The present invention utilizes this advantage, using the stored kinetic energy as the energy source for actuating the carrier 4 in a downward direction.

(3) The base 2 is made of materials having high thermal conductivity. The present invention utilizes this advantage to speed up heat dissipation of the shape memory alloy component 5, and accordingly, response time for actuating the carrier 4 can be reduced.

While this invention has been described by way of examples and in terms of preferred embodiments, it is to be understood that this invention is not limited hereto, and that various changes, substitutions, and alterations can be made herein without departing from the spirit and scope of this invention as defined by the appended claims.

What is claimed is:

1. An actuation device having a shape memory alloy component, comprising:

a base;

a plurality of sliders which are disposed on the base;

a carrier which is disposed on the plurality of sliders;

a shape memory alloy component which is disposed along the outer surfaces of the sliders in a surrounding manner; and a spring component which is disposed on the carrier and surrounds the outer surface of the carrier, wherein by utilizing a length contraction of the shape memory alloy component during phase transformation from martensite to austenite, the sliders are pressed by the shape memory alloy component, move in an inward direction, actuate the carrier in an upward direction and compress the spring component.

2. The actuation device having a shape memory alloy component of claim 1, wherein kinetic energy can be stored in the spring component during compression.

3. The actuation device having a shape memory alloy component of claim 1, wherein each slider is provided with an opening through which the shape memory alloy component contacts the base so that heat dissipation for the shape memory alloy component is hastened.

4. The actuation device having a shape memory alloy component of claim 2, wherein when the shape memory alloy component reverts to its original length, the spring component releases the kinetic energy previously stored within and stretches in an inward direction to press the carrier in a downward direction driving the sliders to move in an outward direction.

5. The actuation device having a shape memory alloy component of claim 1, wherein a plurality of holding components are further provided at the base, securing both ends of the shape memory alloy component.

6. An actuation device having a shape memory alloy component for use with a lens module, comprising:

a base;

a plurality of sliders which are disposed on the base;

a carrier which is disposed on the plurality of sliders;

a shape memory alloy component which is disposed along the outer surfaces of the sliders in a surrounding manner; and a spring component which is disposed on the carrier and surrounds the outer surface of the carrier, wherein by utilizing a length contraction of the shape memory alloy component during phase transformation from martensite to austenite, the sliders are pressed by the shape memory alloy component, move in an inward direction, actuate the carrier in an upward direction and compress the spring component.

7. The actuation device having a shape memory alloy component of claim 6, wherein kinetic energy can be stored in the spring component during compression.

8. The actuation device having a shape memory alloy component of claim 6, wherein each slider is provided with an opening through which the shape memory alloy component contacts the base so that heat dissipation for the shape memory alloy component is hastened.

9. The actuation device having a shape memory alloy component of claim 7, wherein when the shape memory alloy component reverts to its original length, the spring component releases the kinetic energy previously stored within and stretches in an inward direction to press the carrier in a downward direction driving the sliders to move in an outward direction.

10. The actuation device having a shape memory alloy component of claim 6, wherein a plurality of holding components are further provided at the base, securing both ends of the shape memory alloy component.

* * * * *